United States Patent [19]

Cross

[11] 3,917,165
[45] Nov. 4, 1975

[54] TIMER CONTROLLED HIGH AND LOW TEMPERATURE THERMOSTAT

[76] Inventor: Walter A. Cross, R.D. 1, Box 203-3 Rte. 88, Bristolville, Ohio 44402

[22] Filed: Feb. 19, 1974

[21] Appl. No.: 443,811

[52] U.S. Cl. .................... 236/46; 236/47; 337/304
[51] Int. Cl.² ...................... F23N 5/20; H01H 37/12
[58] Field of Search ......... 236/46, 47; 337/304, 301

[56] References Cited
UNITED STATES PATENTS

| 1,541,600 | 6/1925 | Steenstrup | 236/46 |
| 3,825,872 | 7/1974 | Sadler et al. | 337/301 |

Primary Examiner—William E. Wayner
Attorney, Agent, or Firm—Michael Williams

[57] ABSTRACT

A control device for automatically regulating flow of energy-providing substance to a heating source in order to effect optimum usage of energy. The device is particularly adapted to control the temperature of a house, or a room therein, or other space in accordance with day and night heat requirements or occupancy and non-occupancy requirements. Readily available and well known components may be used, and include a low heat and a high heat thermostat, a conventional timer to automatically switch from one thermostat to the other, and these may be electrically wired to components already existing in heating units, such as a household furnace or boiler.

7 Claims, 1 Drawing Figure

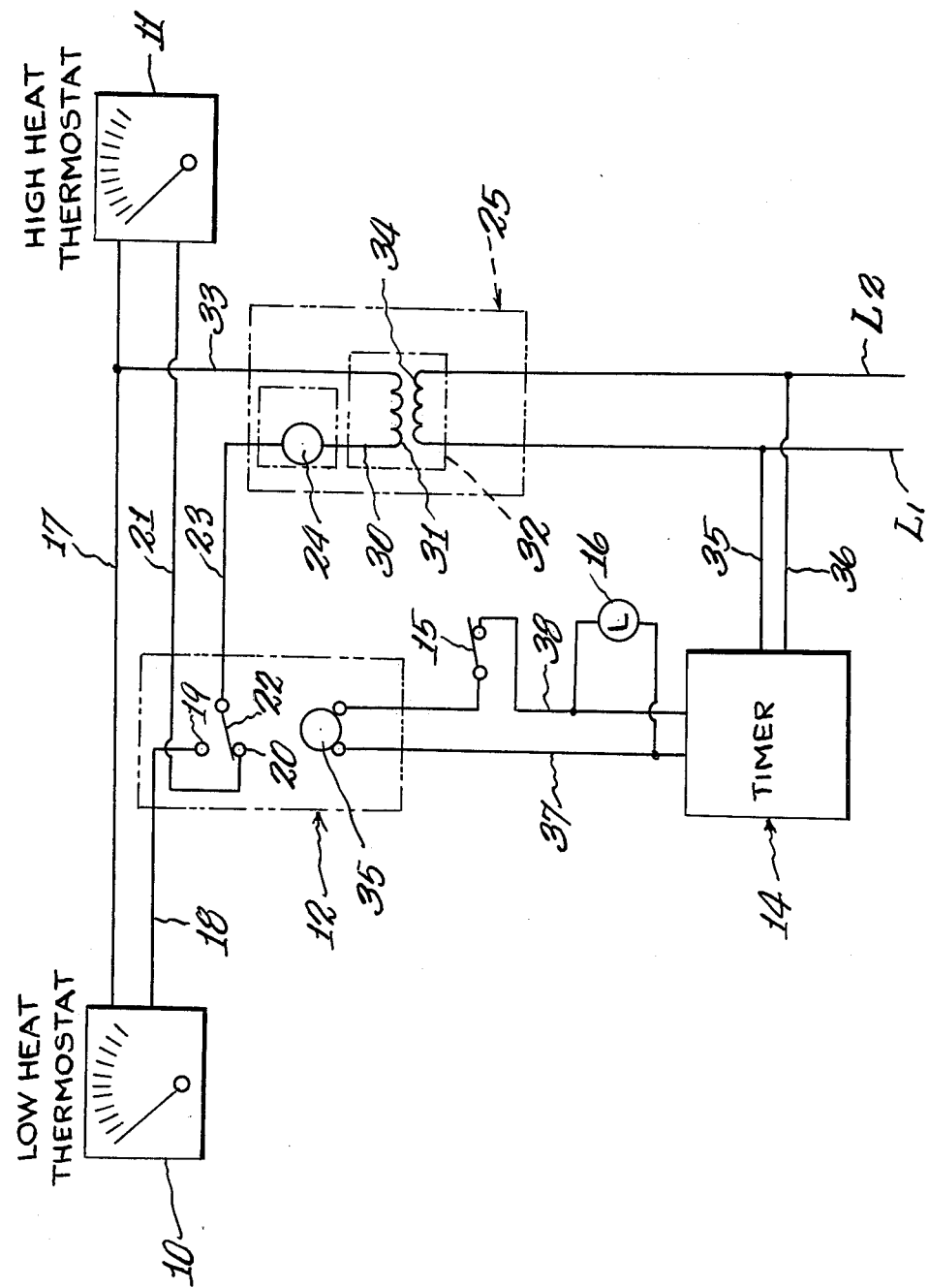

TIMER CONTROLLED HIGH AND LOW TEMPERATURE THERMOSTAT

BACKGROUND AND SUMMARY

Control devices of the general type herein disclosed are known, but to my knowledge none performs as satisfactorily and efficiently as the control device of my invention. Because of the complex and relatively expensive control devices of the prior art, their use has been limited and, as a result, considerable energy is wasted in heating a house during periods when only a minimum of heat is required.

My invention is low in cost, substantially free of maintenance, and easy to set, and therefore overcomes the deficiencies of the prior art. My improved control device comprises a combination of components of known reliability which may be electrically connected without any particular skill. The device comprises a low heat thermostat and a high heat thermostat, electrically connected by means of a relay to switch from one to the other, and a conventional timer to effect operation of the relay.

DESCRIPTION OF THE DRAWING

In the drawing accompanying this description and forming a part of this application, there is shown, for purpose of illustration, an embodiment which my invention may assume, and in this drawing the single FIGURE discloses the control components schematically and illustrates the electrical connection of the same.

DESCRIPTION OF THE PREFERRED EMBODIMENT

My improved control device includes two thermostats 10 and 11, the thermostat 10 being a low heat thermostat in that it is designed to operate in a lower range of temperatures, such as from a high of about 60°F to lower temperatures. The thermostat 11 is a high heat thermostat, designed to operate from a low of about 60°F to higher temperatures. Each of the thermostats is of the usual type that may be set to open or close its switch contacts at a predetermined selected temperature to effect operation of a heating unit.

The heating unit may be of any type presently used, such as electric, oil, gas, or coal, for heating a space such as a house, office, warehouse, factory or the like. The thermostats are located so as to be affected by the temperature in the space to be heated and may be grouped together with the other components of the control within a common housing for portability, or may be separated within the space.

The improved control also includes a relay 12, a timer 14, both of a type commercially available and, if desired, a manually operated switch 15 and a signal light 16. As shown in the drawing, a conductor 17 is electrically connected between one terminal of each of the thermostats 10, 11. The other terminal of thermostat 10 is connected, by conductor 18, to one terminal 19 of the switch of relay 12. The other terminal 20 of the relay switch is connected by a conductor 21, to the remaining terminal of the thermostat 11. The switch arm 22 of the relay switch is connected by a conductor 23 to a magnetic switch or relay 24 which forms part of a unit 25.

The unit 25 is of a type which is incorporated within all conventional heating devices or furnaces, and the type of control relays or switches 24 depend upon the type of energy used to produce the heat. In case of gas or oil, the switch or relay would operate a valve (not shown) which controls flow of the fuel to the combustion apparatus. In case of electric heat, the switch or relay would control flow of electrical energy to the electric heater. One side of the switch or relay 24 is connected by a conductor 30 to one end of the secondary 31 of a transformer 32 which is incorporated in the unit 25. The other end of the secondary 31 is connected by a conductor 33 to the conductor 17.

Opposite ends of the primary 34 of the transformer 32 are respectively connected to lines L1 and L2 which lead to any commercial source of electrical supply. In the embodiment disclosed, the supply is a standard 110 volt source and the transformer 32 is designed to produce 24 volts in the secondary 31.

The timer 14 may be programmed to repeat every 24 hours, or it may be otherwise programmed, such for example, on a 7 day schedule. Conductors 35 and 36 connect the input of the timer 14 to the supply lines L1 and L2. The output of the timer 14 is electrically connected to the coil 35 of relay 12, by conductors 37 and 38. The signal light 16 is connected across the conductors 37, 38 to visually indicate when the timer contacts are closed to supply electricaly current to the conductors 37, 38. As later described, energization of the relay coil 35 will close a circuit to the low heat thermostat 10, and therefore energization of the light 16 will indicate when the furnace or other heating source is operating on low heat. The switch 15 is inserted in series in the conductor 38 so that current flow to the relay coil 35 may be manually interrupted at any time, such as when it is desired that no heat is to be furnished to the space for a length of time. Thus, the programming of the timer need not be disturbed and the timer will continue to operate. When it is subsequently desired to furnish heat to the space, the switch 15 may be closed and the timer will then take over control and function in accordance with its programming.

The switch arm 22 is shown in engagement with switch contact 20, and may be spring-pressed to normally assume this position, and the switch arm will remain in this position when the timer program is such that no current flows in conductors 37, 38, to relay coil 35.

As long as the lines L1 and L2 are connected to a power source, the transformer 32 will be energized. With the switch arm 22 in engagement with the contact 20, the circuit is under control of the high heat thermostat 11 and current will flow through the magnetic switch or relay 24, conductor 23, switch arm 22, conductor 21 to thermostat 11, and from the latter through conductor 33 back to transformer secondary 31. With the switch or relay closed, energy will be supplied to the heating means and the space will be heated. When the space temperature reaches the setting of the thermostat 11, the latter's contacts will open and thus interrupt current flow to the magnetic switch or relay 24 so that the latter will affect the valve or switch it controls to interrupt passage of energy to the heating device or furnace.

When the programming of the timer causes its switch contacts to close, such as during the night time, or week ends in cases of offices, factories, or the like when no occupancy occurs, current will flow to the relay coil 35 to energize the same, and this will cause the switch arm 22 to leave the contact 20 and engage the contact 19. This will now place the circuit under control of the low heat thermostat 10 and control current will flow from the transformer secondary 31, through magnetic switch or relay 24, conductor 23, switch arm 22, conductor 18, thermostat 10, conductors 17 and 33, back to the transformer secondary 31. When the setting of thermostat 10 is reached, its contacts will open to interrupt flow of current through the circuit and magnetic switch or relay 24 will affect the valve or switch it controls to interrupt passage of energy to the heating device or furnace.

I claim:

1. A control device for supply of energy to a heating unit which is adapted to heat a space, comprising:

a low heat thermostat responsive to a lower range of temperatures within said space, and a high heat thermostat responsive to a higher range of temperatures within said space, a control unit for controlling flow of heat-producing energy from a source to said heating unit, switch means for selectively placing said control unit under the influence of said low heat thermostat or said high heat thermostat, timer means for controlling operation of said switch means, said thermostats, said control unit and said switch means being wired in an electrical circuit, said switch means comprising a relay having a coil and an electrical switch operated by energization of said coil, and a manually operable electric switch in said electrical circuit between said timer means and said relay, whereby manual operation of such switch interrupts flow of current to said relay without stopping operation of said timer means.

2. The construction according to claim 1 wherein said timer is adjustable so that it may be programmed to control operation of said switch means at selected times.

3. The construction according to claim 1 wherein said control unit includes a relay having a coil and a control operated by energization of said coil.

4. The construction according to claim 3 wherein said control unit relay coil is in electrical circuit with the secondary of a step-down transformer, and wherein said circuit is interrupted when the thermostat in the circuit responds to a predetermined temperature within said space.

5. The construction according to claim 1 further including an electric light in the circuit between said timer means and said relay coil, said light being energized simultaneously with energization of said relay coil.

6. The construction according to claim 1 wherein operation of said switch means by energization of said relay coil places said low heat thermostat in control of said electrical circuit and removes said high heat thermostat from control of said circuit.

7. A control device for supply of energy to a heating unit which is adapted to heat a space, comprising:

timer means connected directly across the lines of a power source and including a switch for controlling flow of electrical current from said power source, a relay electrically connected to said timer means switch and energized when the latter is closed.

switch means including a pair of contacts and a switch arm movable from normal engagement with one of said contacts to engagement with the other of said contacts when said relay is energized, a low heat thermostat responsive to a lower range of temperatures within said space, and a high heat thermostat responsive to a higher range of temperatures within said space, each of said thermostats including switches, a control unit for controlling flow of heat-producing energy from a source to said heating unit, said control unit including a relay and a switch controlled by said relay, one of said contacts of said switch means being electrically connected to one side of the low thermostat switch and the other side of the latter being electrically connected by a bridging conductor to one side of the high heat thermostat switch, the other side of the latter being electrically connected to the other contact of said switch means, a step-down transformer having its primary winding connected across the lines of said power source, one side of the secondary winding of said transformer being electrically connected to one side of said control unit relay and the opposite side of the latter being electrically connected to the switch arm of said switch means, and the opposite side of said transformer secondary being electrically connected to said bridging conductor.

* * * * *